8611X
H. Holmes,
Making Staves.
Patented Jan. 21, 1835.
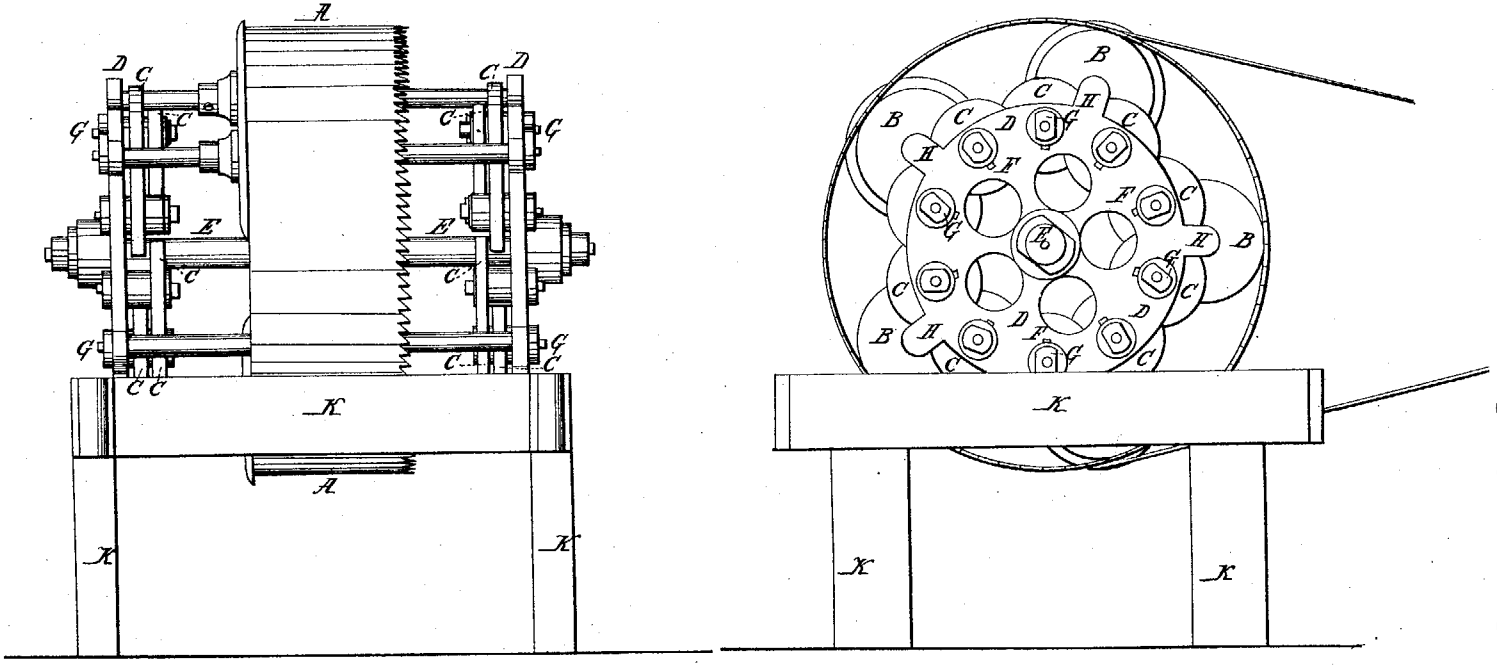
AM. PHOTO-LITHO. CO. N. Y. (OSBORNE'S PROCESS.)

Harvey Holmes, of New Marlborough, Massachusetts,

Letters Patent

The schedule referred to in these letters patent and making part of the same containing a description in the words of the said Harvey Holmes, himself of his improvement in the stave saw for sawing staves and other cylindrical work, To all to whom these presents shall come Be it known that I, Harvey Holmes of New Marlborough in the county of Berkshire, and State of Massachusetts have invented a new and useful improvement in the cylindrical stave saw for sawing staves and other cylindrical work, and that the following is a full and exact description of the construction & operation of the said machine as invented or improved by me, The saw to be in a cylindrical form, the surface of the saw to be concave convex or flat for the purpose of forming the bilge or swell in the stave or for giving a longitudinal curve to the work, or sawing it straight as the case may require, the saw to be supported and move upon a set of friction rollers or wheels which are to be supported and revolve upon a second set of friction rollers or wheels in the following manner, to wit Two cylinders or rims made of cast iron or any kind of metal or wood placed perpendicular, to be fastened by a bar or cross piece through the centre of each at sufficient distance apart to admit the said friction rollers or wheels to play or revolve between them, Flanges or projections are to be made on the outside of the rims below their centre sufficient and for the purpose of screwing and bolting it upon the frame on which it is to be used. The rims also are to have oblong square holes through them at equal distances except where the saw is to be engaged where the space must be wide enough for the timber to pass
between - said square holes to receive a box or bearing for the
journals or axles for the said second set of friction rollers or wheels
to run or revolve in which are held and regulated as a slide
by a set or pinch screw, at the out and inside of said rims so
as to move out and in to enlarge or reduce the circle of the first
named set of friction rollers in such manner as to tighten
or regulate the saw as the case may require The said set of friction rollers may also run or revolve
upon pivots or studs fastened through said rims instead of said
boxes or bearings so that the rollers may run separate or de-
tached from each other in either way; the rims of said second
set of friction rollers, or wheels must pass by each other as
close as may be and not interfere or produce friction and
in so passing by to form an angle or groove upon the surface
where they pass each other so as to receive the journals or axles
of the first mentioned set of friction rollers to run or revolve
upon their surface; Guards or loops are to be fastened to said
rims and project over the bearings or axles of said first set
of friction rollers in such manner as to prevent them from dis-
-engaging or falling off from said second set of friction rol-
lers when the band and saw are taken off and which confine
them to the surface when on; One or more of said first set
of friction rollers to be set a little diagonal or askew from the
others to make a small angle with the other rollers at the
ends towards the teeth of the saw, to incline the saw back
against flanges which are to be fixed and made on the back
end of three or more of the said first set of rollers on which
the saw is placed to prevent the saw from running off
from the rollers, the saw being set upon the first set of rollers
a band or strap passes round it as round a drum, except
a sufficient space to admit the timber that is to be sawed to
pass through between the two sides of the band, Friction pulleys

8611X are placed one above, and one below the carriage that carries
the timber to be sawed to keep the band close to the saw, —
The top or upper pulley to be held by an arm attached to one
of the rims, the other to the frame below, The timber to be sawed
to be carried between the side of the band where they have the
saw, on a carriage, The band passing around the saw, also
passes over the drum separate from the machine and propelled
by any revolving power, All of the above mentioned wheels or
rollers to be made of any kind of metal or wood it will require
about nine of the first named set of friction rollers or wheels
and about twenty of the second set for a saw two feet in dia-
-meter which is the proper size for a barrel and for other uses
in proportion

What I claim as my invention in the above described
machine is an improvement in the application of the
second set of friction rollers or wheels for the journal or
axles of the first named set of friction rollers or wheels
to run or revolve upon their surface to prevent friction
and thereby to accelerate the speed or motion of the saw
so as to enable more work or business to be performed in
the same time than of any other machine

For further illustration of the same I
refer to the model and drawing of same deposited in
the Patent Office In witness whereof I have this fifteenth day
of September in the year of our Lord one thousand eight hun-
dred and thirty four, subscribed my name —

Harvey Holmes

Witnesses

M. T. Wilson
E. McFarland (Drawing)

[illegible]

(1023 words)